United States Patent
Kumar et al.

(10) Patent No.: US 12,086,160 B2
(45) Date of Patent: Sep. 10, 2024

(54) ANALYZING PERFORMANCE OF RESOURCE SYSTEMS THAT PROCESS REQUESTS FOR PARTICULAR DATASETS

(71) Applicant: Oracle International Corporation, Redwood Shores, CA (US)

(72) Inventors: Rupesh Kumar, Fremont, CA (US); Sean Joseph Connolly, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 7 days.

(21) Appl. No.: 17/699,817

(22) Filed: Mar. 21, 2022

(65) Prior Publication Data

US 2023/0086827 A1 Mar. 23, 2023

(30) Foreign Application Priority Data

Sep. 23, 2021 (IN) .............................. 202141043065

(51) Int. Cl.
| | | |
|---|---|---|
| *G06F 16/27* | (2019.01) | |
| *G06F 11/34* | (2006.01) | |
| *G06F 16/21* | (2019.01) | |
| *G06F 16/22* | (2019.01) | |

(52) U.S. Cl.
CPC ........ *G06F 16/278* (2019.01); *G06F 11/3409* (2013.01); *G06F 16/21* (2019.01); *G06F 16/2282* (2019.01)

(58) Field of Classification Search
CPC .................................................. G06F 16/278
USPC ........................................................ 707/609
See application file for complete search history.

(56) References Cited

U.S. PATENT DOCUMENTS

| | | | |
|---|---|---|---|
| 9,424,330 B2 | 8/2016 | Prasanna | |
| 9,633,076 B1 | 4/2017 | Morton et al. | |
| 10,152,499 B1* | 12/2018 | Wilton | G06F 16/219 |
| 10,169,433 B2 | 1/2019 | Lerios et al. | |
| 10,339,147 B1* | 7/2019 | Barmes | G06N 5/046 |
| 2012/0131309 A1* | 5/2012 | Johnson | G06F 8/40 |
| | | | 712/E9.004 |
| 2014/0280276 A1* | 9/2014 | Prasanna | G06F 16/2358 |
| | | | 707/758 |
| 2015/0149609 A1 | 5/2015 | Zou et al. | |

(Continued)

OTHER PUBLICATIONS

"Azure Monitor Metrics aggregation and display explained," Retrieved at https://docs.microsoft.com/en-us/azure/azure-monitor/essentials/metrics-aggregation-explained, Retrieved on Mar. 2022, pp. 16.

(Continued)

*Primary Examiner* — Muluemebet Gurmu
(74) *Attorney, Agent, or Firm* — Invoke

(57) ABSTRACT

Techniques for managing dataset resource instance performance via a data-centric approach are disclosed. A system determines an aggregated level of service demands placed on individual dataset resource instances that may be in a distributed computing system. The system may identify portions of a dataset that are associated with high levels of service demands. Once identified, the system may provide an administrator with the service demand information. The administrator may relocate these high demand dataset portions to other dataset resource instances that are better able to respond to the high levels of demand without impaired performance.

21 Claims, 15 Drawing Sheets

(56) References Cited

U.S. PATENT DOCUMENTS

| | | | | |
|---|---|---|---|---|
| 2018/0240020 A1* | 8/2018 | Madaan | ............ | G06F 16/2465 |
| 2019/0228847 A1* | 7/2019 | Soli | ...................... | G06F 3/0482 |
| 2019/0260793 A1* | 8/2019 | Stockdale | ............... | H04L 41/22 |
| 2021/0034587 A1* | 2/2021 | Arye | ...................... | H03M 7/70 |

OTHER PUBLICATIONS

"Managing Source Data," Delphix, Retrieved at https://docs.delphix.com/docs/configuration/capacity-and-resource-management/managing-source-data, Retrieved on Mar. 2022, pp. 3.

"Performance Analytics Tool Overview," Retrieved at https://docs.delphix.com/docs/configuration/performance-analytics-management/performance-analytics/performance-analytics-tool-overview, Retrieved on Mar. 2022, pp. 5.

"Scaling services with Shard Manager," Retrieved at https://engineering.fb.com/2020/08/24/production-engineering/scaling-services-with-shard-manager/, Retrieved on Mar. 2022, pp. 15.

"Sharding Considerations—Practical MongoDB Aggregations," Retrieved at https://www.practical-mongodb-aggregations.com/guides/sharding.html, Retreived on Mar. 2022, pp. 10.

"Sharding with Amazon Relational Database Service," Retrieved at https://aws.amazon.com/blogs/database/sharding-with-amazon-relational database-service/, Mar. 2019, pp. 7.

Gill M., "Visualizing Performance Metrics of a Sharded MongoDB Cluster on One MMS Chart," Mongo DB, Dec. 2013, pp. 4.

Hollander T., "Visualizing Performance Metrics of a Sharded MongoDB Cluster on One MMS Chart," Mongo DB, Jun. 2018, pp. 7.

Krahn R. et al., "TEEMon: A continuous performance monitoring framework for TEEs," Dec. 2020, pp. 15.

Mothila T. et al., "Parallel Aggregation on Sharded Clusters," International Journal of Computer Sciences and Engineering, vol. 3, Issue 9, 2015, pp. 39-43.

* cited by examiner

ANALYZING PERFORMANCE OF RESOURCE SYSTEMS THAT PROCESS REQUESTS FOR PARTICULAR DATASETS

BENEFIT CLAIMS; RELATED APPLICATIONS; INCORPORATION BY REFERENCE

This application claims the benefit of Indian Provisional Patent Application No. 202141043065, filed Sep. 23, 2021, which is hereby incorporated by reference.

TECHNICAL FIELD

The present disclosure relates to managing operational performance of resources applied to the processing of datasets. In particular, the present disclosure relates to performance analysis and visualization of dataset resource instances, in a system that may include partitioned and/or replicated dataset resource instances (e.g., a database system).

BACKGROUND

Maintaining high levels of database performance is critical for routine business operations, whether used for inventory management, personnel management, financial transactions, communications, or other types of business operations. In most cases, database performance is monitored and managed by monitoring the performance of the underlying computing hardware. For example, when database operations exhibit a reduced level of performance (e.g., slower query response times), a database administrator may determine whether the machines on which the database is operating require modification. Example modifications may include adding working memory or adding processor capacity. In other examples, reduced database performance may be associated with the database operating system and/or management software. In these examples, a database administrator may apply any number of software upgrades or modifications. Regardless of the source of decreased database performance, the performance level is evaluated at the level of the entire database and/or storage device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DATA CENTRIC ANALYSIS AND MANAGEMENT OF DATABASE PERFORMANCE
4. EXAMPLE EMBODIMENTS
5. COMPUTER NETWORKS AND CLOUD NETWORKS
6. MISCELLANEOUS; EXTENSIONS
7. HARDWARE OVERVIEW

1. General Overview

One or more embodiments identify service demands corresponding to any particular dataset by aggregating service demands across the multiple resource instances corresponding to the particular dataset. The system presents the individual and aggregated service demand levels to an administrator. In one example, the administrator may use this information to relocate subsets of the dataset (e.g., data chunks) from dataset resource instances associated with a first dataset to a dataset resource instance (or instances) that are associated with a second dataset. Alternatively, or additionally, the system may automatically relocate one or more subsets of data and thereby redistribute the consumption of computing resources.

One or more embodiments described in this Specification and/or recited in the claims may not be included in this General Overview section.

2. Architectural Overview

Figure 1:
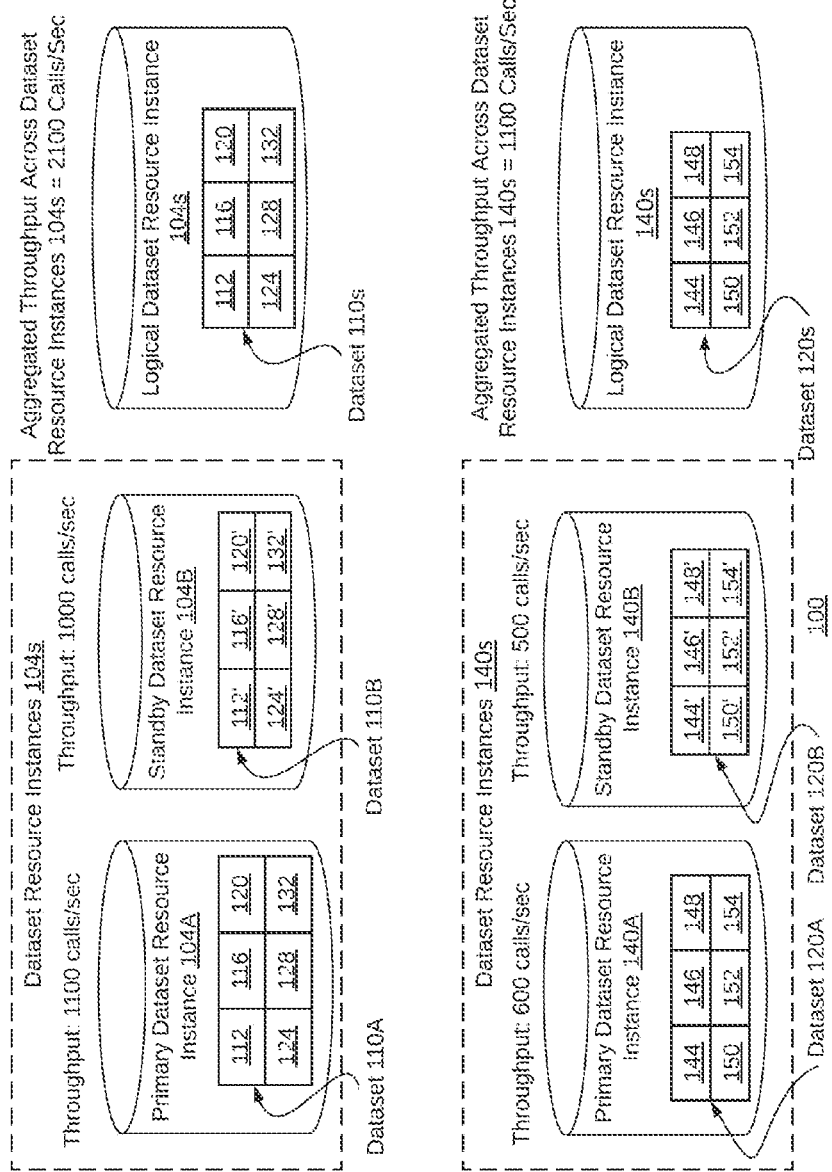
FIG. 1 is block diagram of a system in accordance with one or more embodiments.

FIG. 1 illustrates a system 100 in accordance with one or more embodiments. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, system 100 includes any number of groups of dataset resource instances, each group serving requests associated with a corresponding dataset. As an example, the system 100 may include a group of dataset resource instances 104s and a group of dataset resource instances 140s. In some examples, the dataset resource instances may be embodied as computing resources that are associated with a particular dataset. In one illustration, a dataset resource instance may include processors/processor capacity, storage device/storage capacity, instances of executable code, and combinations thereof that are assigned to perform computing transactions associated with a particular dataset. In some examples, an instance may also include capabilities to process and/or execute transactions on datasets separate from the particular dataset with which the instance is associated. In some examples, a dataset resource instance may be an assigned a set of hardware and/or software resources, such as individually identifiable servers and/or storage devices. In other examples, a dataset resource instance may be a designated proportion of computing resources (e.g., processor cycles, storage capacity, a number of transactions/quantity of time for code execution) allocated in a distributed or virtualized computing environment (e.g., "cloud computing"). In still other examples, an instance is an instantiation of one or more databases, database shards, servers, and/or software systems.

In one specific illustration, the dataset resource instances may be associated with a partitioned and/or replicated database. Alternatively or additionally, one or more of the dataset resource instances may be associated with an unpartitioned and/or non-replicated database. A partitioned database may be, for example, a sharded database. A "shard" of a database is a storage architecture that is a horizontal partition of data. In one illustration, a shard may be embodied as one or more rows of data (i.e., a horizontal partition) taken from a parent table. A shard may be replicated across a primary instance and one or more standby instances, each with their own storage locations, processor resources, code execution resources, and the like.

Returning to FIG. 1, each of the dataset resource instances 104s, 140s is shown as including a primary dataset resource instance and a standby resource instance. The dataset resource instance 104s includes a primary dataset resource instance 104A and a standby dataset resource instance 104B. Dataset 110A is stored as an element of the primary dataset resource instance 104A. The dataset 110A is composed of data subsets 112-132. Dataset 110B is stored as an element of the standby dataset resource instance 104B. The dataset 110B is composed of data subsets 112'-132'. In this example, the dataset 110B is a replication of the dataset 110A.

The dataset resource instance 140s includes a primary dataset resource instance 140A and a standby dataset resource instance 140B. Dataset 120A is stored as an element of the primary dataset resource instance 140B. The dataset 140A is composed of data subsets 144-154. Dataset 120B is stored as an element of the standby dataset resource instance 140B. The dataset 120B is composed of data subsets 144'-154'. In this example, the dataset 120B is a replication of the dataset 120A.

In some examples, the primary dataset instances 104A, 140A use read/write storage structures. In some examples, the standby instances 104B, 140B use redundant data structures that are replicated versions of the datasets stored in their corresponding primary resource instances. In some examples, the standby dataset resource instances 104B, 140B use read-only data structures that may respond to queries (thereby reducing the number of operations executed by the corresponding primary dataset resource instance) but cannot be directly written to by a user. Instead, to maintain data integrity, updates made to primary dataset resource instance 104A, 140A by user write operations are replicated to a corresponding one of the standby dataset resource instances 104B, 140B, using data duplication systems that prevent direct user access to the standby dataset resource instance 104B, 140B. One example of a data duplication system is that of DATA GUARD® by Oracle Corporation®.

In some examples, computing transactions may be executed by one or both of the primary dataset instances 104A, 140A and/or the standby dataset instances 104B, 140B. The primary dataset instances 104A, 140A are capable of executing both read operations and write operations. The standby dataset resource instances 104B, 140B are configured to execute read operations. This redundant storage architecture may be used in database systems for high availability ("HA") and/or for disaster recovery ("DR").

The primary instances 104A, 140A and the corresponding standby dataset resource instances 104B, 140B may store their respective datasets 110A, 110B, 120A, 120B in a way that includes further subdivisions within the datasets. These subdivisions are indicated as subsets 112-132 for the dataset 110A, subsets 112'-132' for the dataset 110B, subsets 144-154 for the dataset 120A, and subsets 144'-154' for the dataset 120B. In some examples, these may be referred to as "portions" or "chunks." In one example in which the datasets 110A, 110B, 120A, 120B are table data, the chunks may be portions of the horizontally partitioned data that may correspond to particular datasets. For example, a data chunk may correspond to rows of data associated with a particular unique user identifier. In another example, a data chunk may correspond to rows of data associated with computing transactions during a particular unit of time (e.g., an hour, a day, etc.) or from a particular location (e.g., a geographic area, a designated work location, an IP address).

Each of the dataset resource instances 104s, 140s shown in FIG. 1 also indicate a data throughput for each of primary instances 104A, 140A and standby instances 104B, 140B. The data throughput quantity is a specific example of a service demand placed on the dataset resource instance, in this case denominated in terms of calls to the database per second. However, other types of service demands may be analyzed using the embodiments described herein, such as number of active sessions, service time per call, and others.

As shown, the data throughput for primary dataset resource instance 104A is 1100 calls per second. The data throughput for standby dataset resource instance 104B is 1000 calls per second. The data throughput for primary dataset resource instance 140A is 600 calls per second. The data throughput for standby dataset resource instance 140B is 500 calls per second.

Also shown in FIG. 1 are the service demand levels aggregated across the dataset resource instances, primary and standby, for each of the instances 104s and 140s. This aggregated throughput quantifies the total number of service demands (in this case calls/second) placed on the dataset resource instance as a whole. That is, the aggregated throughput is a sum of the service demands on the primary dataset resource instance and the one or more standby dataset resource instances. In this illustration, the aggregated throughput on the dataset resource instances 104s is 2100 calls/second and the aggregated throughput on the dataset resource instances 140s is 1100 calls/second.

This aggregated service demand on a dataset resource instance includes a more granular approach than some other computing management systems that might monitor service demands placed on any one resource instance (e.g., a database) or computing resource (e.g., a server). Analyzing demands placed on an individual resource fails to provide a granular understanding of whether any particular dataset resource instances, particular datasets, or particular dataset portions are causing or contributing to a measured service demand level.

Figure 2A:
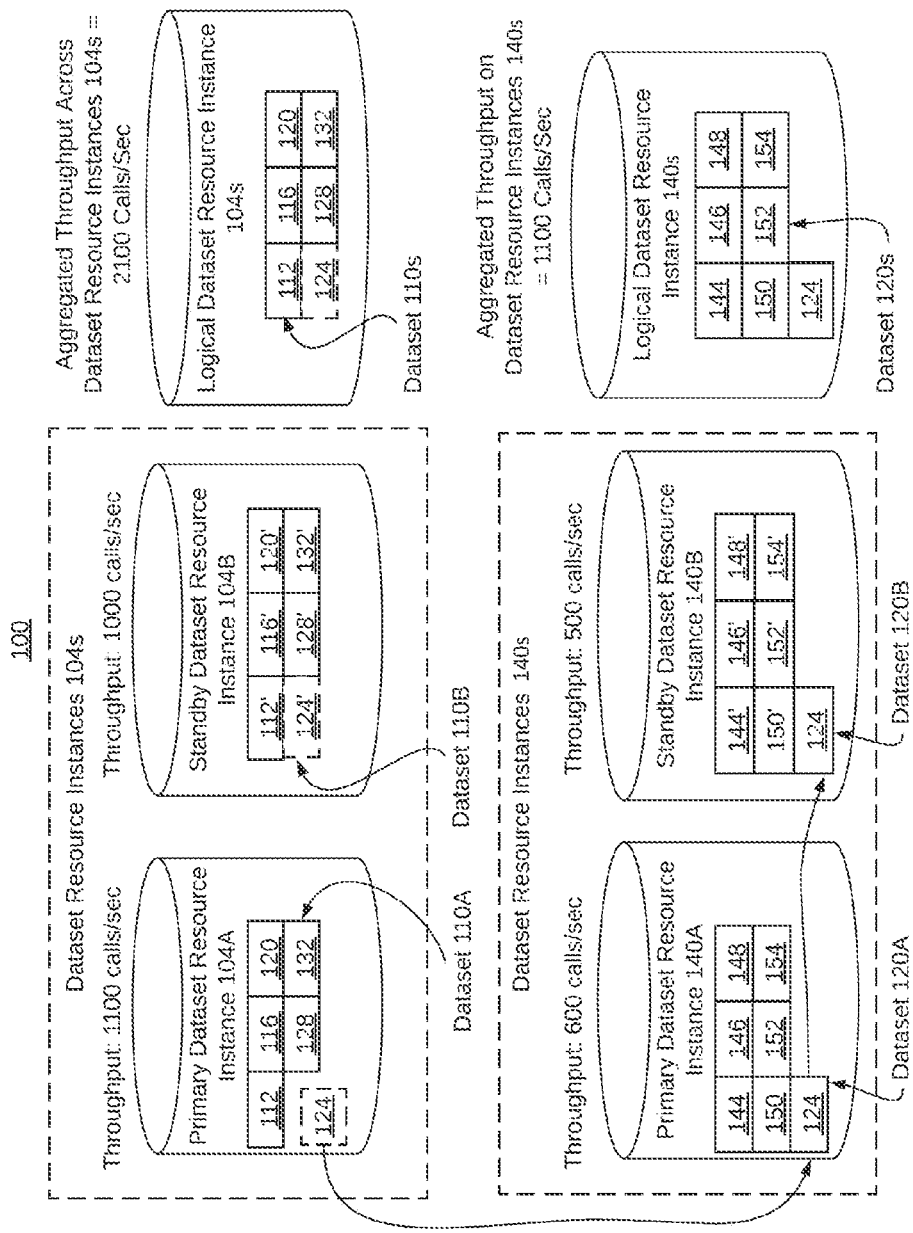
FIGS. 2A and 2B illustrate an example of identifying and relocating of a portion of a dataset associated with an elevated level of service demand from one dataset resource instance to another, in accordance with one or more embodiments.
Figure 2B:
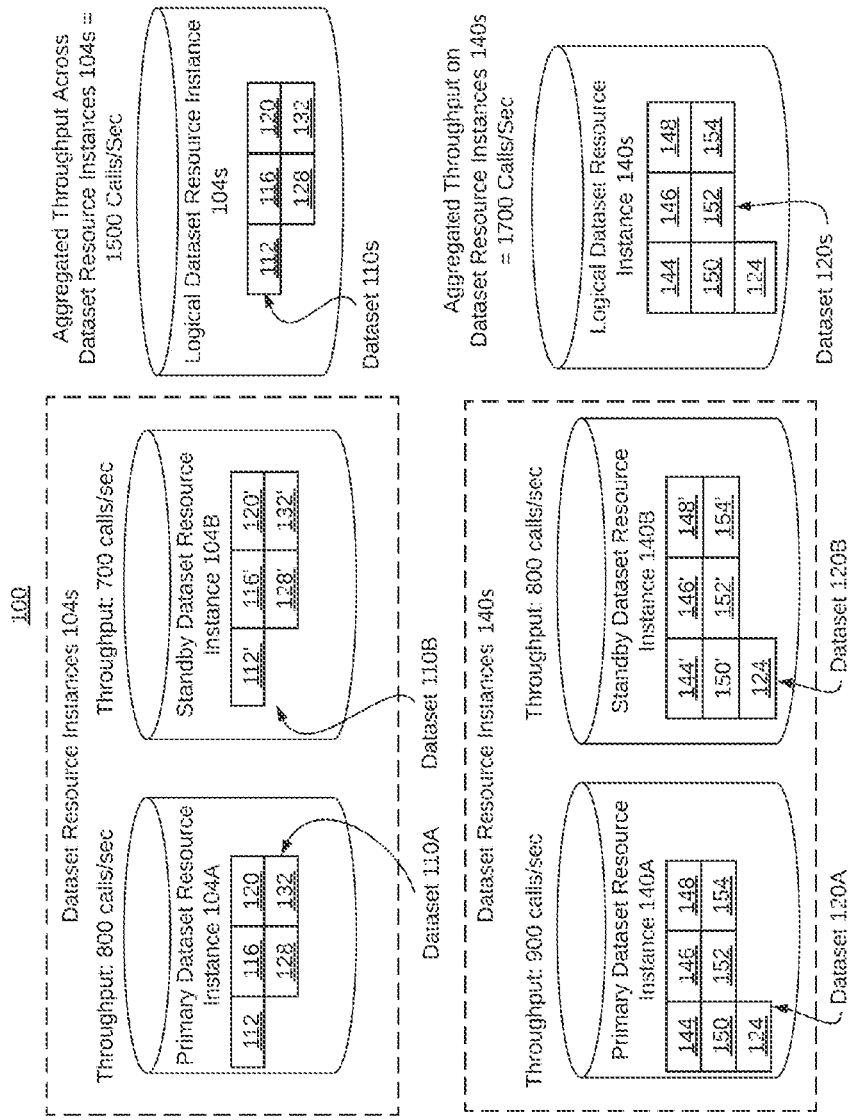

FIGS. 2A and 2B illustrate an example in which embodiments of the present disclosure may be used to determine that a particular portion of a dataset and/or a particular instance of a group of data resource instances is associated with a high service demand level. FIGS. 2A and 2B, when viewed collectively, also illustrate an embodiment in which a system may indicate and/or relocate the portion of the dataset to an under-utilized dataset resource instance, thereby balancing computing load.

FIG. 2A includes the dataset instances 104s, 140s, their corresponding primary instances 104A, 140A and standby instances 104B, 140B, datasets 110A, 110B, 120A, 120B, and corresponding dataset subsets described above in the context of FIG. 1. The same throughputs associated with each dataset resource instance (individually and collectively) in FIG. 1 are also indicated in FIG. 2A.

Using techniques described below in the context of FIG. 3, the system may identify an aggregate service demand level across associated dataset resource instances collectively by a granular identification of resource demands placed on individual instances. In an example illustration of a database management system, a system executing the techniques of FIG. 3 may identify a separate service demand level for instances of a group of logically associated database shards, database instances, and/or collective dataset instances. These individual service demand values may then be aggregated to capture the service demand level for the database as a whole. This illustration may be adapted in a more general sense to dataset resource instances.

In the illustration in FIG. 2A, a system employing the embodiments described herein may detect an aggregated service demand level, in this case throughput, across individual dataset resource instances that is also aggregated for the group of logically associated dataset resource instances. In the illustration of FIG. 2A, the primary dataset resource instance 104A of the dataset resource instances 104s has a data throughput of 1100 calls/second. The standby dataset resource instance 104B of the dataset resource instances 104s has a data throughput of 1000 calls/second. The primary dataset resource instance 140A of the dataset resource instances 140s has a data throughput of 600 calls/second. The standby dataset resource instance 140B of the dataset resource instances 140s has a data throughput of 500 calls/second. As also indicated, the aggregated throughput of the dataset resource instances 104s is 2100 calls/second and the aggregated throughput on the dataset resource instances 140s is 1100 calls/second.

The granular identification of this service demand level per dataset resource instance is helpful in accurately managing the allocation of computing resources. As indicated above, a group of logically related dataset resource instances and the various associated datasets may be distributed over a number of separate instances, datasets, and/or portions of datasets. Because the system may analyze a service demand level (in this case, throughput of calls/second) on each of these aspects individually (which may be aggregated) an administrator may understand which elements of distributed dataset resources are being called most frequently. An administrator may more precisely and more effectively manage the performance of a dataset resource computing system collectively when system demand data is presented on a per instance, per dataset, and/or per dataset portion basis.

In some examples, the system may also identify particular portions, sub-sets, and/or data chunks associated with a high service demand level. That is, the system may identify specific subsets of data that are being queried, written to, read from, or otherwise processed more frequently than other datasets associated with a particular instance (or a group of instances). By identifying portions of data that are contributing to a dataset resource instance service level more than other portions associated with the same instance, the system may recommend re-location of these high service demand data portions. This fine-grained analysis of demands on a data portion by data portion basis enables the system to precisely manage dataset resource instance operations, thereby improving performance of the system as a whole with minimal consumption of management resources.

This dataset-based approach is illustrated in FIGS. 2A and 2B with respect to the relocation of a chunk 124. For example, the system may determine that chunk 124 is associated with a significant portion of the 1100 calls/second placed on the primary dataset resource instance 104A and a similarly significant portion of the 1000 calls/second placed on the standby dataset resource instance 104B.

In one example, the system may identify the chunk 124 to an administrator, optionally in the context of the aggregated throughput on the dataset resource instances 104s. For example, the system may present a chunk 124 throughput of 300 calls/second for each of the primary and standby dataset resource instances 104A, 104B (for a total of 600 calls/second). The system may also present the aggregated throughput of the dataset resource instances 104s (2100 calls/second). If a particular dataset (e.g., a database) is distributed between both the dataset resource instances 104s and the dataset resource instances 140s, the system may additionally present the aggregated throughput of the dataset resource instances 140s (1100 calls/second).

In this example, and as illustrated in FIG. 2A, an administrator may relocate the chunk 124 from the primary dataset resource instance 104A to the primary dataset resource instance 140A. In some embodiments, the system itself may relocate the chunk 124. In either case, FIG. 2A shows that the chunk 124 is stored on the primary dataset resource instances 140s after its removal from dataset resource instances 104s. Because standby dataset resource instance 140B may not be written to directly by a user, the system may indirectly store the chunk 124 on the standby dataset resource instances 140B by operation of data duplication software (described above).

FIG. 2B illustrates the various effects and/or outcomes of removing the chunk 124 from the dataset resource instances 104s and relocating the chunk 124 to the dataset resource instances 140s. As shown in FIG. 2B, the chunk 124 is no longer stored in any instance of the dataset resource instances 104s. Instead, the chunk 124 is now stored on the primary dataset resource instance 140A and the standby dataset resource instance 140B of the dataset resource instances 140s.

By moving the chunk 124 from the dataset resource instances 104s, the system reduces the aggregated throughput on the dataset resource instances 104s from 2100 calls/second to 1500 calls/second. This reduction in throughput is also reflected in the individual instance 104A, 104B throughputs. Specifically, the throughput on the primary dataset resource instance 104A is reduced 300 calls/second (from 1100 calls/second to 800 calls/second) and the throughput on the standby dataset resource instance 104B is also reduced 300 calls/second (from 1000 calls/second to 700 calls/second). Analogously, by moving the data chunk 124, the system balances the aggregated service level demands between the dataset resource instances 104s and dataset resource instances 140s because the corresponding throughputs on the primary and standby resource instances 140A, 140B have each increased 300 calls/second and the aggregated throughput on the dataset resource instances 140s has increased 600 calls/second.

Various embodiments described herein may involve the use of computer networks. Additional embodiments and/or examples relating to computer networks are described below in the section titled "Computer Networks and Cloud Networks."

In some examples, a dataset resource instance may be embodied as a database stored in a data repository. In one or more embodiments, a data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as the system 100. Alternatively or additionally, a data repository may be implemented or executed on a computing system separate from system 100. A data repository 104 may be communicatively coupled to system 100 via a direct connection or via a network.

In one or more embodiments, system 100 refers to hardware and/or software configured to perform operations described herein. Examples of operations for the system 100 are described below with reference to FIG. 3 for identifying aggregated computing resource demand levels, individual computing resource demand levels, dataset and data portion (chunk) demand levels.

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 may include an interface (not shown) that refers to hardware and/or software configured to facilitate communications between a user and system 100. An interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of an interface may be specified in different languages. The behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, an interface is specified in one or more other languages, such as Java, C, or C++. Some examples of a user interface are described in further detail below.

3. Data Centric Analysis and Management of Database Performance

Figure 3:
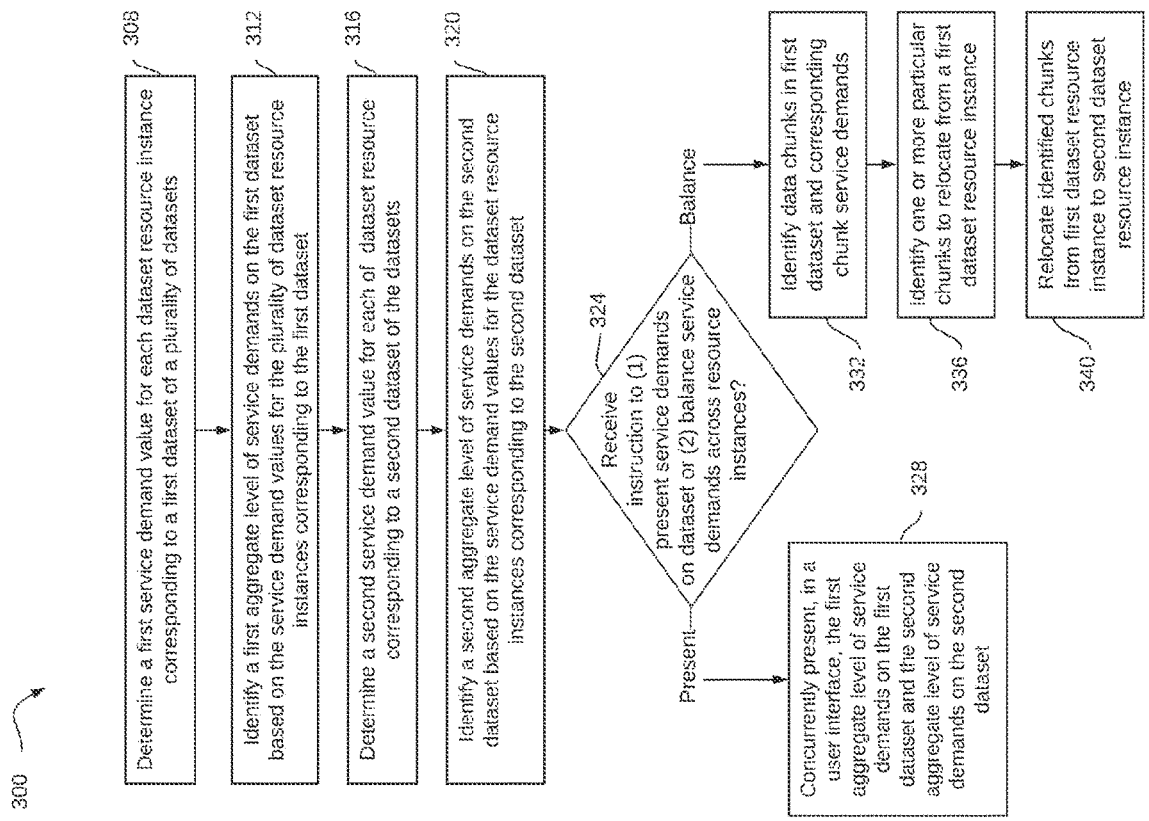
FIG. 3 illustrates an example set of operations for determining aggregate service demands across multiple dataset resource instances, in accordance with one or more embodiments.

FIG. 3 illustrates an example set of operations, collectively referred to as a method 300 for analyzing and managing dataset resource instance performance using a data centric technique, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

The method 300 may begin with the system determining a first service demand value for each of the dataset resource instances within a group of instances that are associated with a dataset (operation 308). For example, referring to FIG. 2A, data that is associated with the dataset resource instances 104s is stored in two separate instances 104A and 104B. The operation 308 detects the incoming transactions (or other types of service demands) for each of the instances that are associated with a particular dataset. As noted above, one or more embodiments may be practiced using one or more partitioned, unpartitioned, replicated, and/or non-replicated databases.

The system may determine the service demand value for each dataset resource instance by, for example, inspecting incoming instructions and determining the type of action that is instructed, determining an average execution time by comparing time stamps for an incoming instruction packet and a corresponding response packet, among other techniques. Once the system collects these data for each dataset resource instance, the system may detect the dataset that is logically associated with the dataset resource instance. For example, the system may detect the dataset resource instance associated with the dataset by detecting profile data associated with the dataset, identifying designated network communication pathways (e.g., addresses/routes/file hierarchies) that indicate the dataset instance, among other techniques.

The system may generate an aggregate level of service demand corresponding to each of the datasets (operation 312). The system may accomplish this by identifying the demand value for each dataset resource instance and grouping the results based on the associated dataset identifier. Once grouped, the system may sum the associated service levels to generate an aggregated service demand level for the dataset, regardless of the number or degree of distribution of the individual dataset resource instances that are associated with the dataset.

The preceding elements may be repeated for each dataset that is associated with a group of dataset resource instances. Specifically, the system may determine additional service demand values for each dataset resource instance associated with an additional dataset of the plurality of datasets (operation 316). These additional service demand values may be aggregated to determine an aggregated service demand level for a second dataset of the plurality of datasets analogous to the operation 312 (operation 320). The system may repeat these operations for each dataset of the plurality to determine the relative service demands between the constituent datasets processed by one or more dataset resource instances.

In some examples, the system may receive instructions (or execute stored instructions) for presenting service demand data in a user interface, automatically balancing service demands across dataset resource instances, or both (operation 324). As one example, the system may receive and/or execute instructions to present service demand data without also balancing service demands. As another example, the system may receive and/or execute instructions for balancing service demands without also presenting service demand data. As yet another example, the system may receive and/or execute instructions for both presenting service demand data and balancing service demands.

If the instructions include instructions to present the service demand data, then the system may concurrently present, in a user interface, a representation of the data that includes an aggregate level of service demands on one dataset of the database and an aggregate level of service demands on any other datasets of the database (operation 328). In some embodiments, the presented representation of the data may even include depicting data chunk service demands. In some examples, the system may present the most active data chunks associated with a dataset distributed between various dataset resource instances (e.g., a database distributed between storage servers, data distributed between different database instances and/or database shards, and/or datasets distributed across an entire database) along with an identification of the corresponding dataset. In other examples, the system may present the most active data chunks associated with each dataset.

If the instructions include instructions to automatically balance service demands across dataset resource instances, then the method 300 proceeds to the operation 332 in which the system identifies data chunks experiencing high service demands.

The system may identify a chunk (or multiple chunks) as a candidate to relocate from one dataset resource instance to another dataset resource instance that has a lower aggregated service demand level (operation 336). In some examples, the identified chunk(s) that is a candidate to be relocated may be identified based on its service demand level being above a threshold service demand level. In other examples, a candidate chunk may be identified relative to other analyzed chunks. For example, chunks in the top 10% of a ranked list of service demands may be identified as candidates to be relocated.

Once a chunk is identified in the operation 336, the system may transfer or otherwise relocate the chunk to another dataset resource instance with a lower aggregate service demand value (operation 340). Relocating a chunk can improve overall system performance without requiring allocation of additional computing resources. Thus, in addition to improving system performance, one or more embodiments reduce overall cost of ownership associated with the system.

Determining a target location for the chunk may be based on a variety of factors. The system may select a target location that is physically and/or logically proximate (e.g., requiring the fewest network hops, being in the same geographic location, being in the same network segment, etc.) to where demand for that chunk tends to originate (e.g., the average user in the user base). Avoiding unnecessary physical and/or logical distance between the chunk and its users can help keep latency, and thereby service times, lower than if the chunk were relocated to a more physically and/or logically distant location. Alternatively or additionally, the target location may be based on metrics indicating times when demand is highest for the particular chunk and the candidate target locations. The system may select a target location that tends to have lower demand at times when the chunk tends to have higher demand, to help keep demand distributed over time and avoid excessive peaks in demand that the system may not be able to service in a timely manner. For example, the system may select a target location based on performance metrics over a preceding time window, such as a certain number of hours or days.

In some embodiments, the method 300 may proceed directly from the operation 320 to the operation 332. In this embodiment, the system may proceed directly to relocating a chunk based on a stored instruction and without presenting data in a user interface.

4. Example Embodiments

The above embodiments have other applications. Because the analysis is data-centric (i.e., based on activity associated with a particular shard and/or a particular dataset and not the underlying computing hardware), the potential applications are extensive.

For example, any number of performance metrics for a computing system, particularly distributed computing systems, may be analyzed using the demands placed on datasets rather than on hardware behavior. In one illustration, a particular server or storage device may be overloaded and/or operating slowly. Using the above techniques, a system may determine that a particular portion of a database, whether a shard or a data chunk, is being accessed at such a high rate that the server is unable to respond. Rather than implementing a more powerful service, the data may simply be relocated to a server that is underutilized.

In another embodiment, the system may use keys (some of which are described above) and SQL data to determine that a particular dataset, chunk, or shard is being accessed by an application that is not expected to be accessing that particular dataset, chunk, or shard. By detecting this unexpected communication, the system may detect a hacking attempt or a denial-of-service attack.

In still another embodiment, the system may identify a chunk that is being accessed at an expected rate but that is nevertheless a cause of a slow response time. This data may be used to determine a cause of the slow performance (for example, a particular SQL query or other form of access having unexpectedly high processing time). This avoids needless hardware changes.

As discussed herein, one or more embodiments generate a user interface (e.g., a GUI) that presents individual and/or aggregated information about the service demands on one or more datasets. The user interface may present information about service demands in many different ways. In one example, the user interface includes a two-dimensional heat map view that provides information about one or more datasets (e.g., the sizes of database shards) and associated performance. Different properties of the user interface may convey different kinds of information. For example, the size (e.g., height, width, or area) of an element corresponding to a particular shard may represent that shard's storage size in bytes, number of chunks, number of unique keys, or average active sessions. The color and/or pattern of an element may represent one or more performance metrics for that shard (or a range thereof), such as usage measured as throughput (e.g., calls per second), usage measured as service time (e.g., milliseconds per call), or the size rate of change (e.g., kilobytes per second).

The information to be conveyed by one or more properties of an element in the heat map (e.g., size, shape, color, pattern, animation, etc.) may be configurable via user input to the user interface. For example, a user may select which information to convey with each property. Alternatively or additionally, a user may select or input one or more thresholds that define ranges or "bands" of information (e.g., different colors for different ranges of service times). Alternatively or additionally, one or more thresholds may be predefined or determined by the system. For example, the system may determine a threshold based on the observed value ranges, dividing those ranges into a predetermined number of bands (e.g., dividing the values in thirds).

Figure 4A:
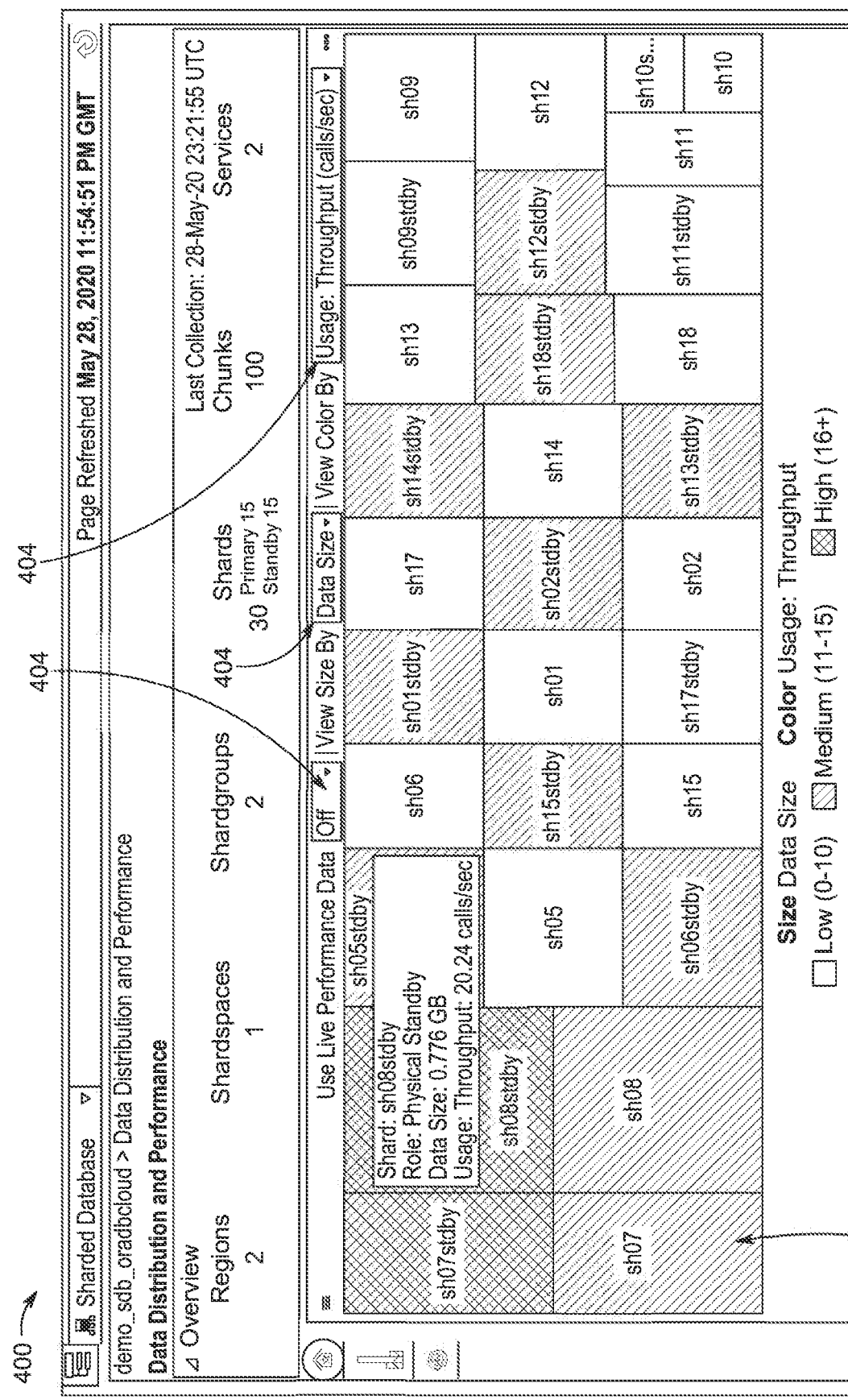
FIGS. 4A-4J illustrate examples of a graphical user interface in accordance with one or more embodiments.

FIGS. 4A-4J illustrate examples of a GUI 400 in accordance with one or more embodiments. Specifically, FIGS. 4A-4J illustrate examples using a shard-based data tier architecture designed by Oracle Corporation, with corresponding terminology. Other embodiments may use different kinds of storage architecture(s) and/or terminology. As shown in FIG. 4A, the GUI 400 includes a heat map showing properties of database shards, with each shard represented as an element (e.g., element 402) in the heat map. In this example, shards are shown as "tiles," although other shapes may be used. Controls 404 allow a user to select whether to present live (versus static) performance data, what the sizes of elements represent, and what the colors of elements represent. Some examples of controls are described in further detail below.

In FIG. 4A, a dataset is distributed over two regions with one shardspace, two shardgroups, thirty shards total (fifteen primary and fifteen standby), one hundred chunks, and two services providing access to the dataset. The sizes of data elements represent the data sizes of the shards, and the colors (illustrated in FIG. 4A as different patterns) represent throughput in calls per second. The color coding divides performance into three predetermined bands: low throughput (0-10 calls/second); medium throughput (11-15 calls/second); and high throughput (16 or more calls/second).

Figure 4B:
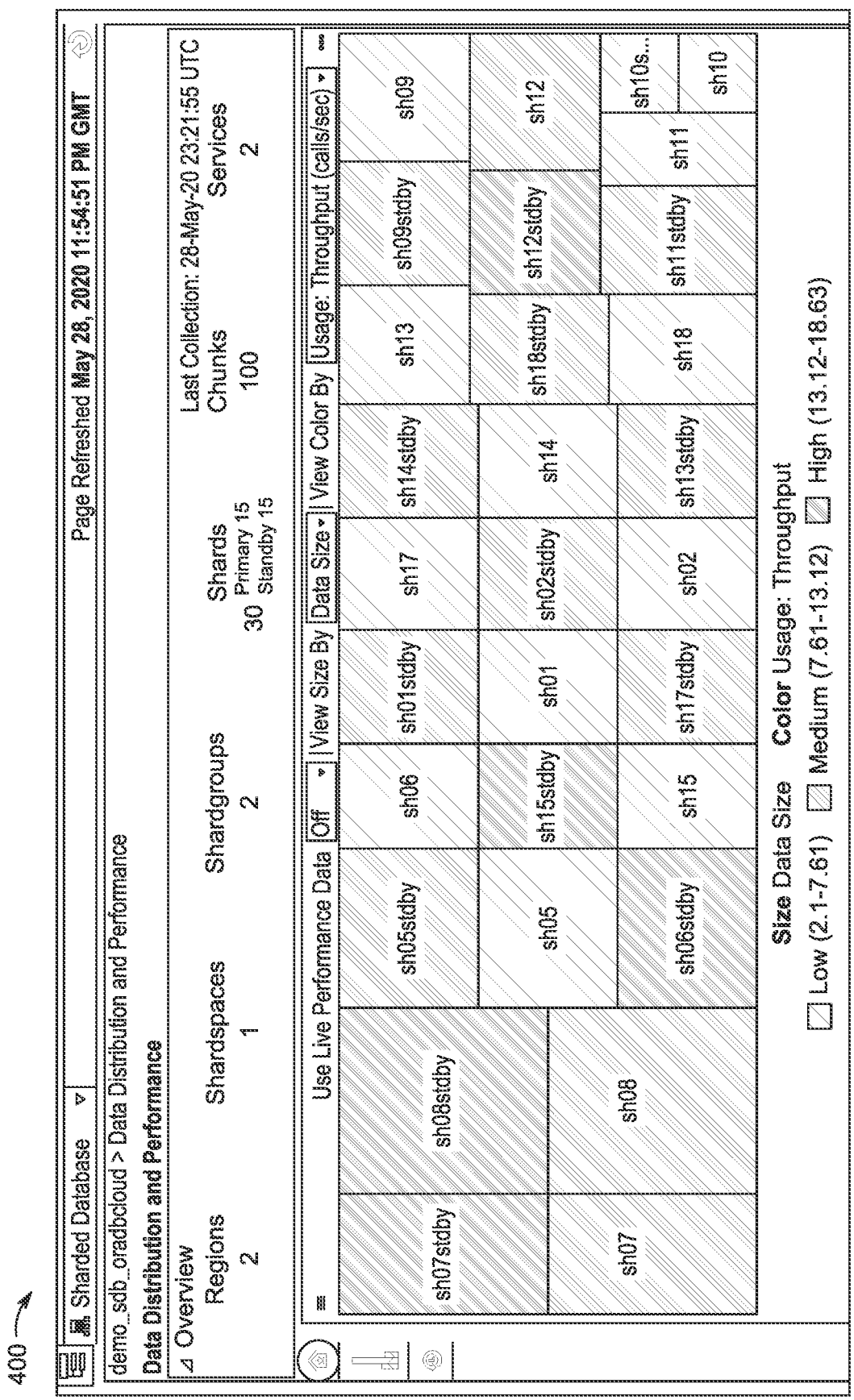

In FIG. 4B, the GUI 400 includes a monochromatic heat map (i.e., different shades and/or patterns of the same color, illustrated in FIG. 4B as different pattern densities). The system automatically generates the color band ranges, based on the range of observed values for the entire dataset, resulting in three bands: low throughput (2.1-7.61 calls/second); medium throughput (7.61-13.12 calls/second); and high throughput (13.12-18.63 calls/second).

Figure 4C:
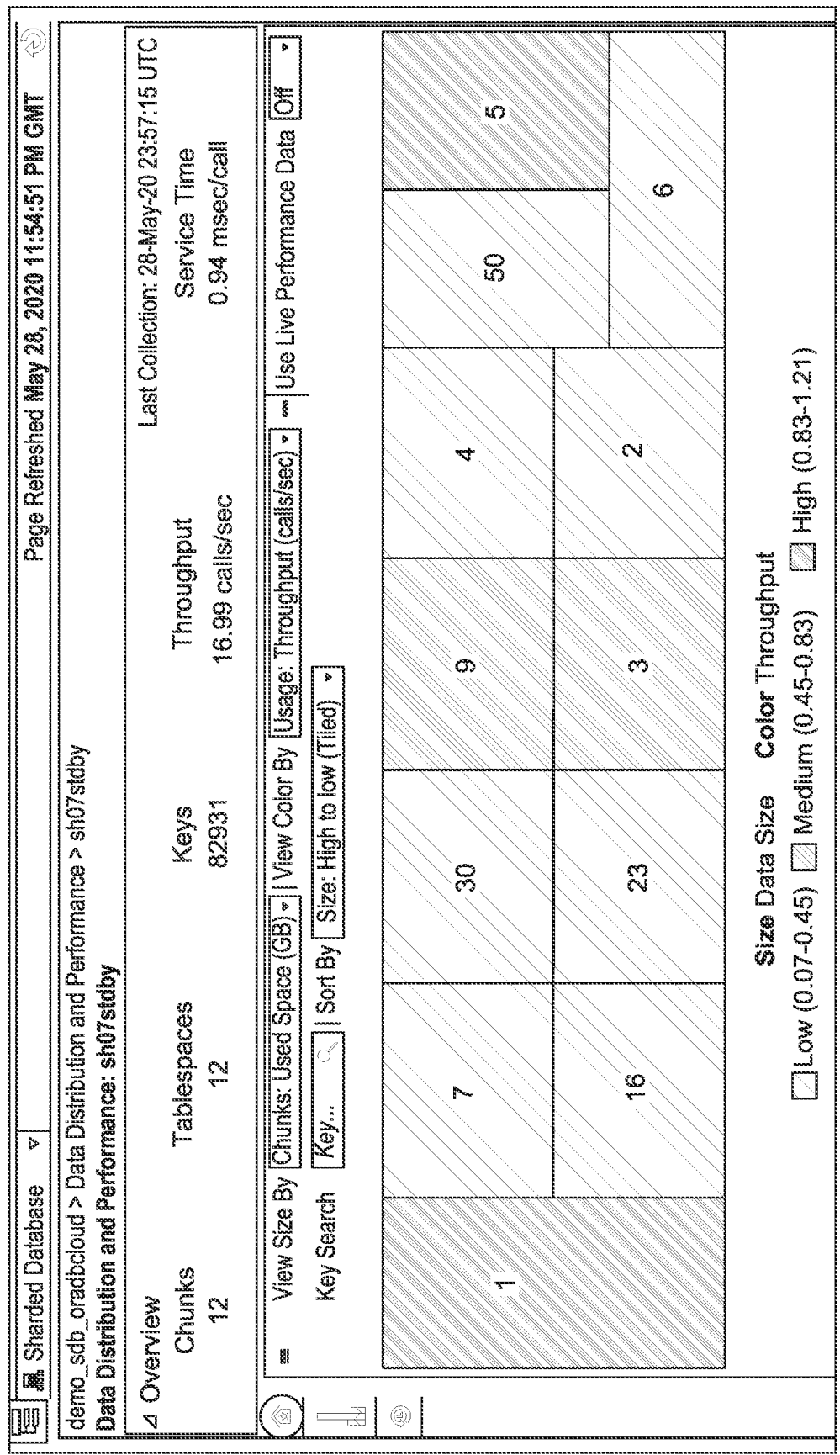

FIG. 4C illustrates an example of a heat map for a single shard, in this example the shard labeled "sh07stdby" (i.e., the standby shard for shard 07). In this example, the elements correspond to individual chunks. The size of each element represents the corresponding chunk's data size, and the color of each element represents the corresponding chunk's throughput performance band. The system automatically generates the color band ranges, based on the range of observed performance values for the shard, resulting in three bands: low throughput (0.07-0.45 calls/second); medium throughput (0.45-0.83 calls/second); and high throughput (0.83-1.21 calls/second).

Figure 4D:
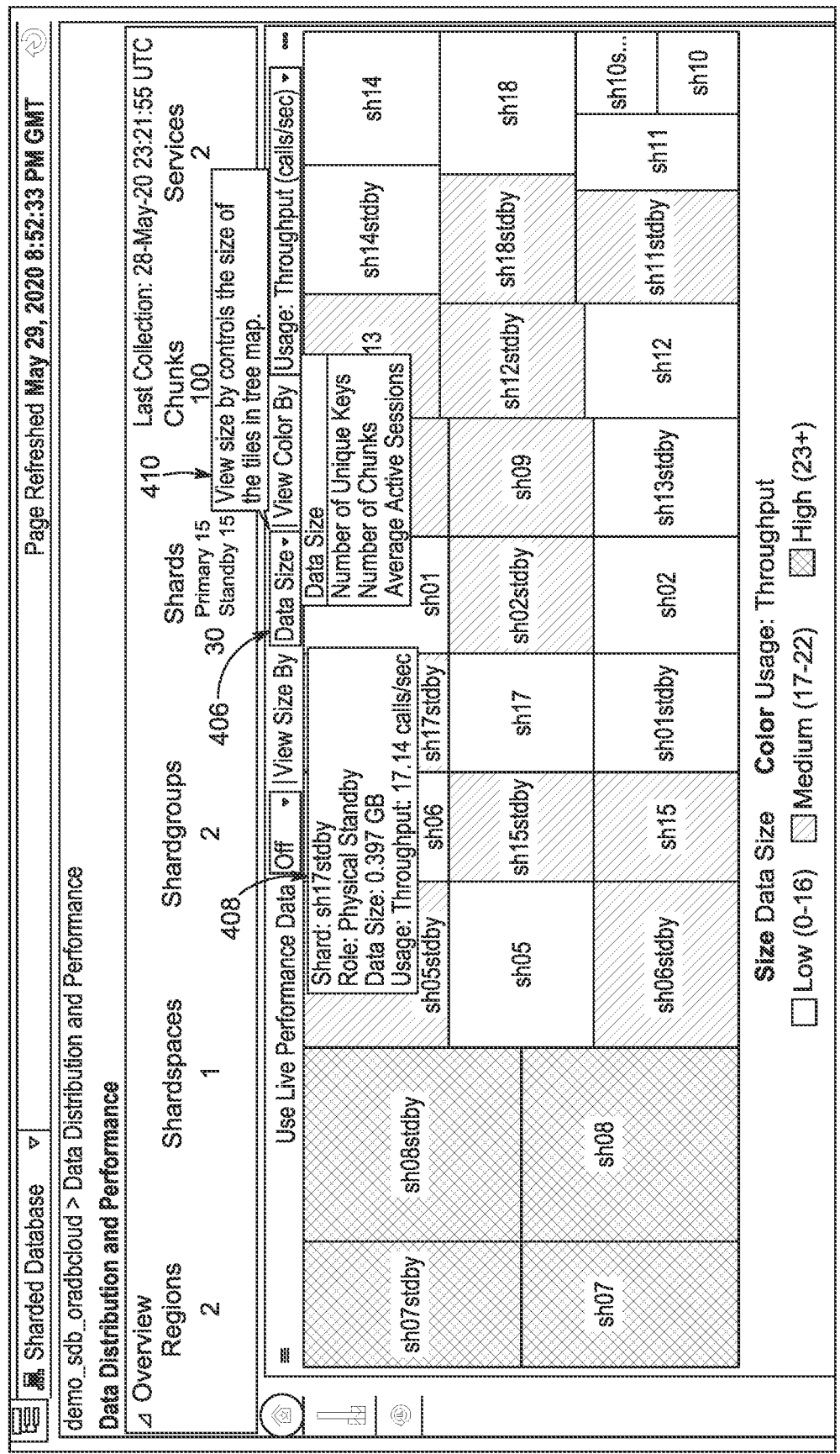
Figure 4E:
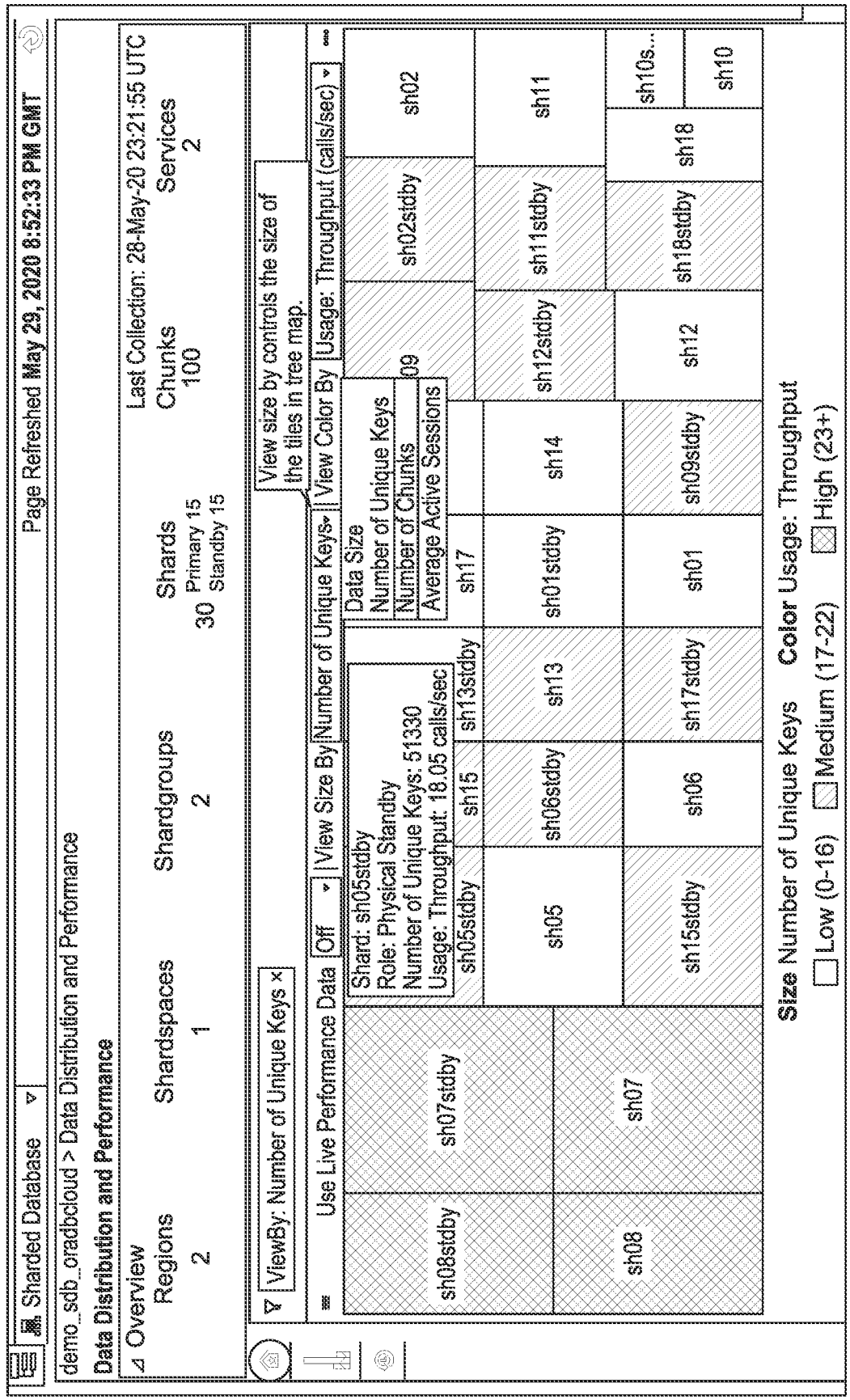
Figure 4F:
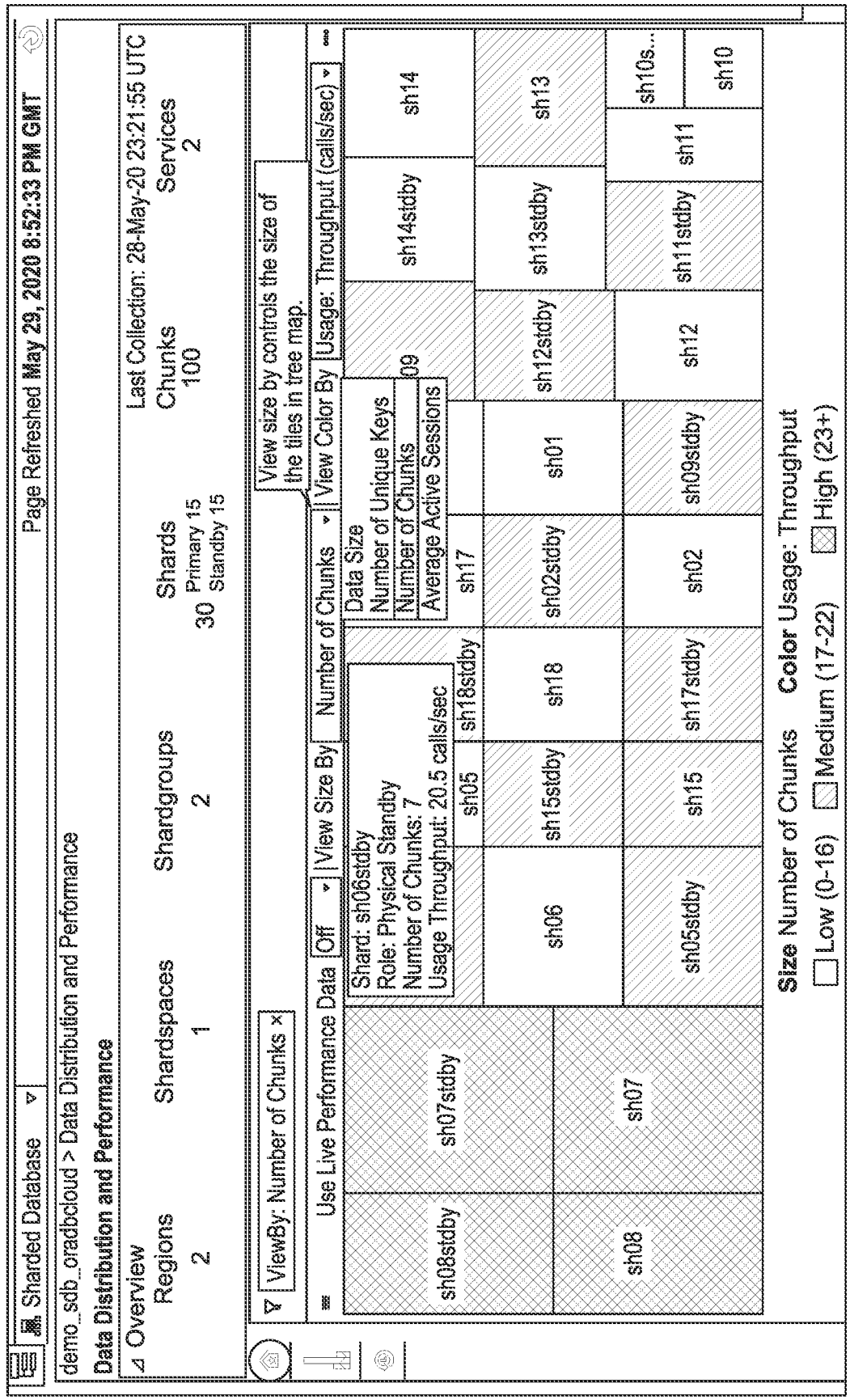
Figure 4G:
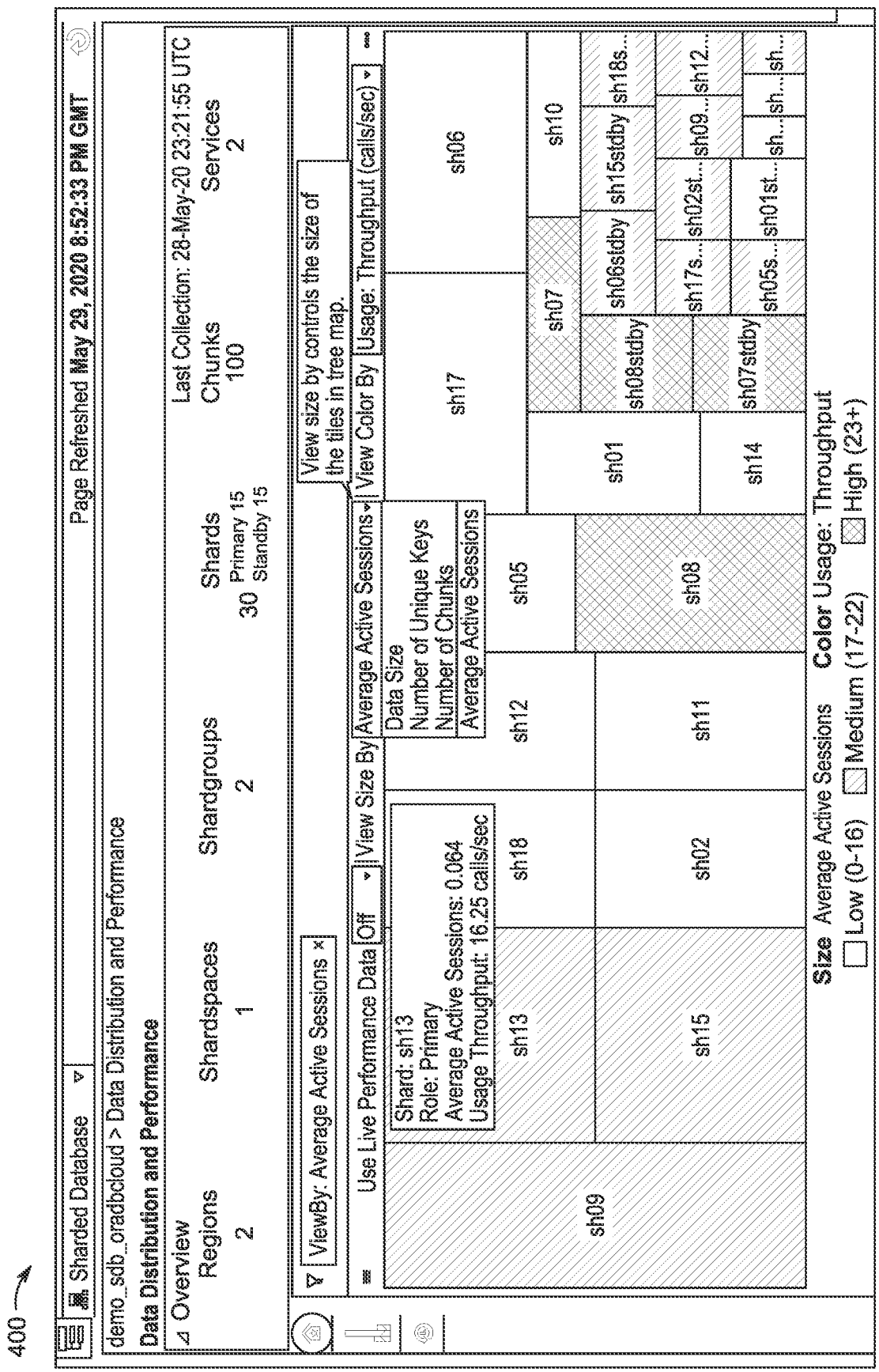

FIGS. 4D-4G illustrate an example of a control 406 for changing what the size of each element represents in the GUI 400. In this example, the GUI 400 includes a heat map for an entire dataset. The user can use the control 406 to select from data size, number of unique keys, number of chunks, and average active sessions. Responsive to the user's selection, the system modifies the heat map so that the element sizes are proportional based on the selected size metric. A tooltip 408 shows additional information about an individual shard, and a help dialogue 410 provides guidance on how to use the control 406. In FIG. 4D, "data size" is selected, so that element sizes are proportional to each shard's data size. In FIG. 4E, "number of unique keys" is selected, so that element sizes are proportional to each shard's number of unique keys. In FIG. 4F, "number of chunks" is selected, so that element sizes are proportional to the number of chunks in each shard. In FIG. 4G, "average active sessions" is selected, so that element sizes are proportional to the average number of active sessions observed over a particular time interval.

Figure 4H:
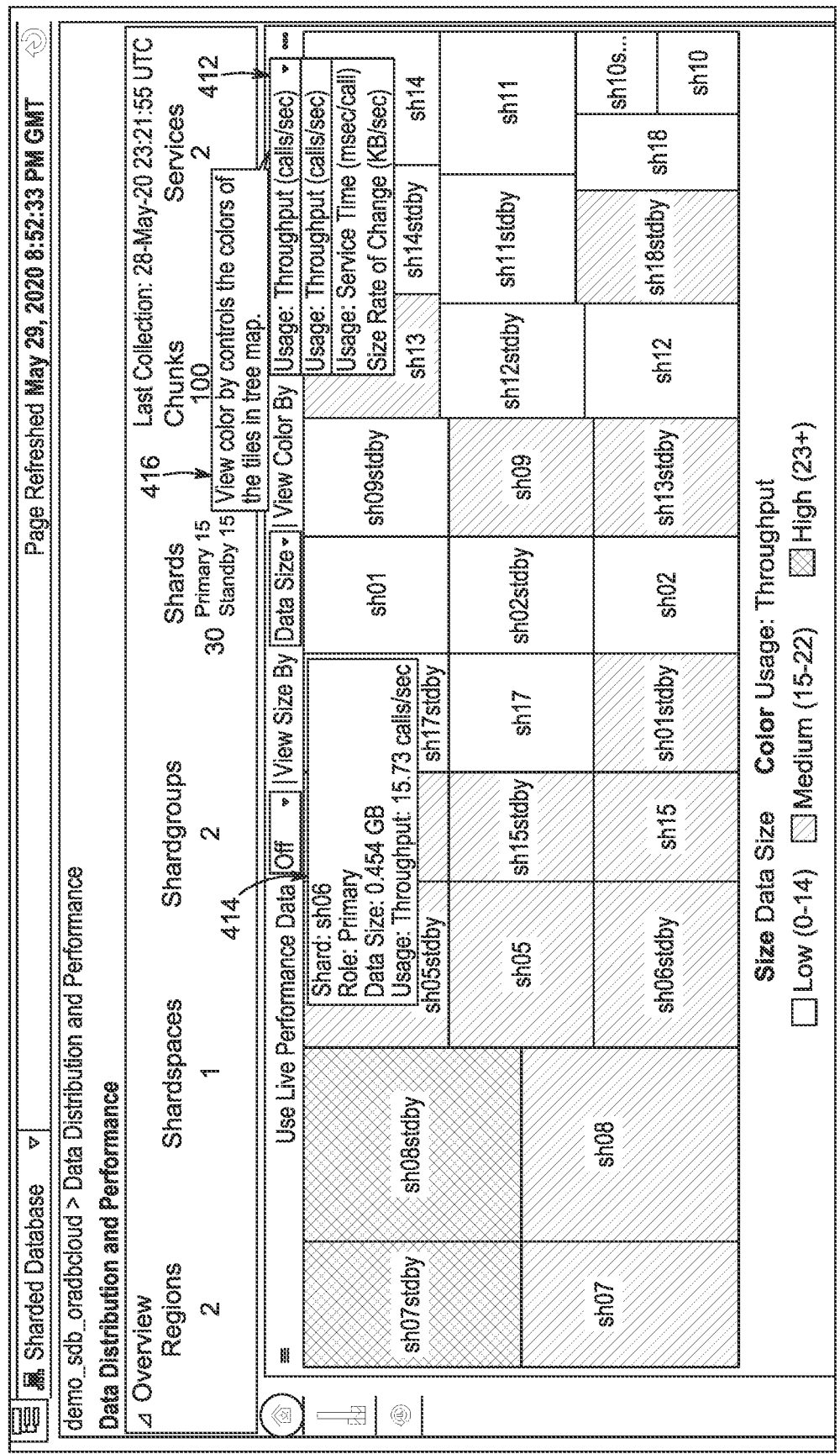
Figure 4I:
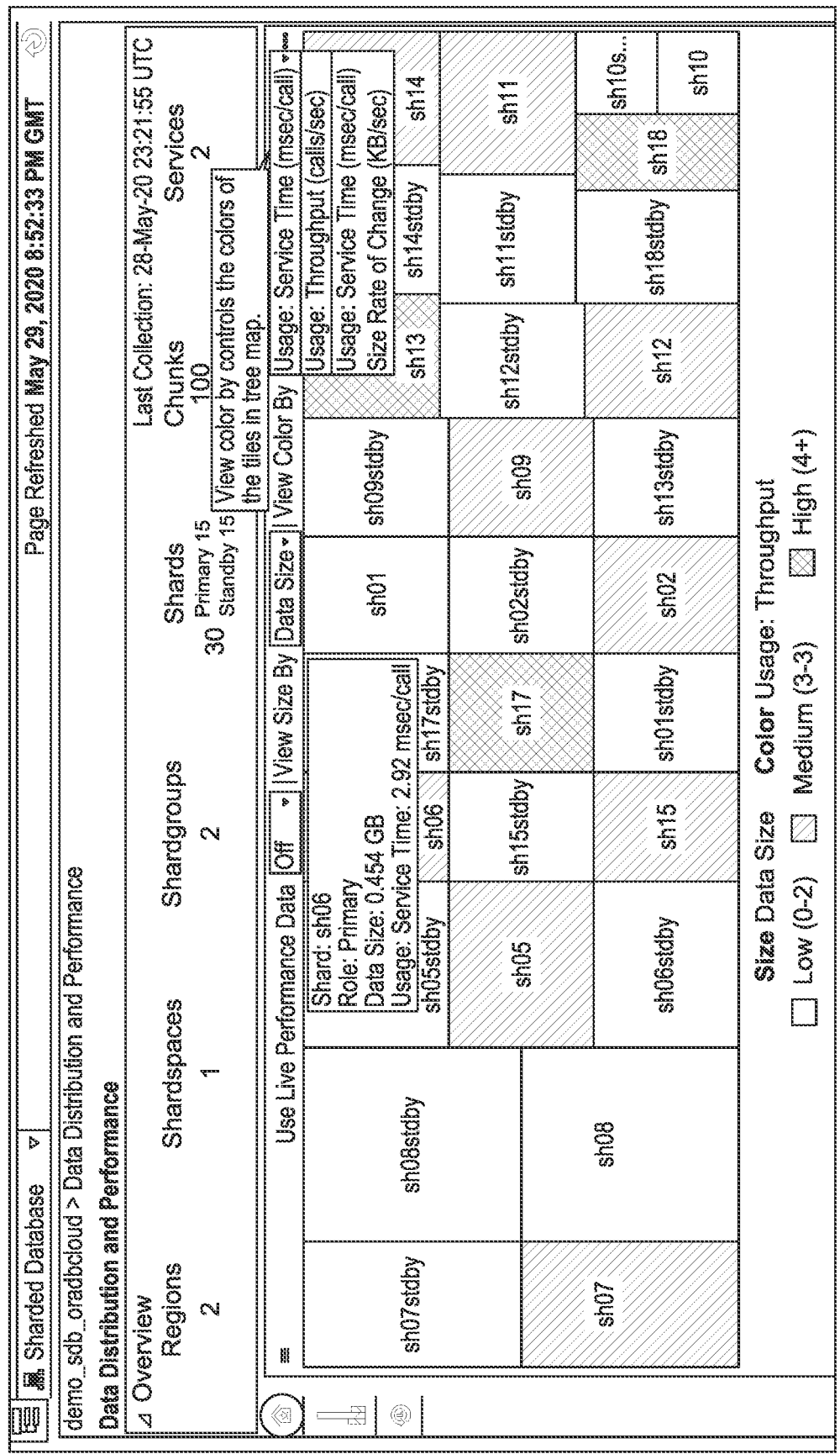

FIGS. 4H-4I illustrate an example of a control 412 for changing what the color of each element represents in the GUI 400. In this example, the GUI 400 includes a heat map for an entire dataset. The user can use the control 412 to select from usage measured as throughput in calls per second, usage measured as service time in milliseconds per call, or the size rate of change in kilobytes per second. Responsive to the user's selection, the system modifies the heat map so that the element colors correspond to the colors assigned to each performance band. A tooltip 414 shows additional information about an individual shard, and a help dialogue 416 provides guidance on how to use the control 412. In FIG. 4H, "calls/sec" is selected. In FIG. 4I, "msec/call" is selected. An example using size rate of change is not shown.

Figure 4J:
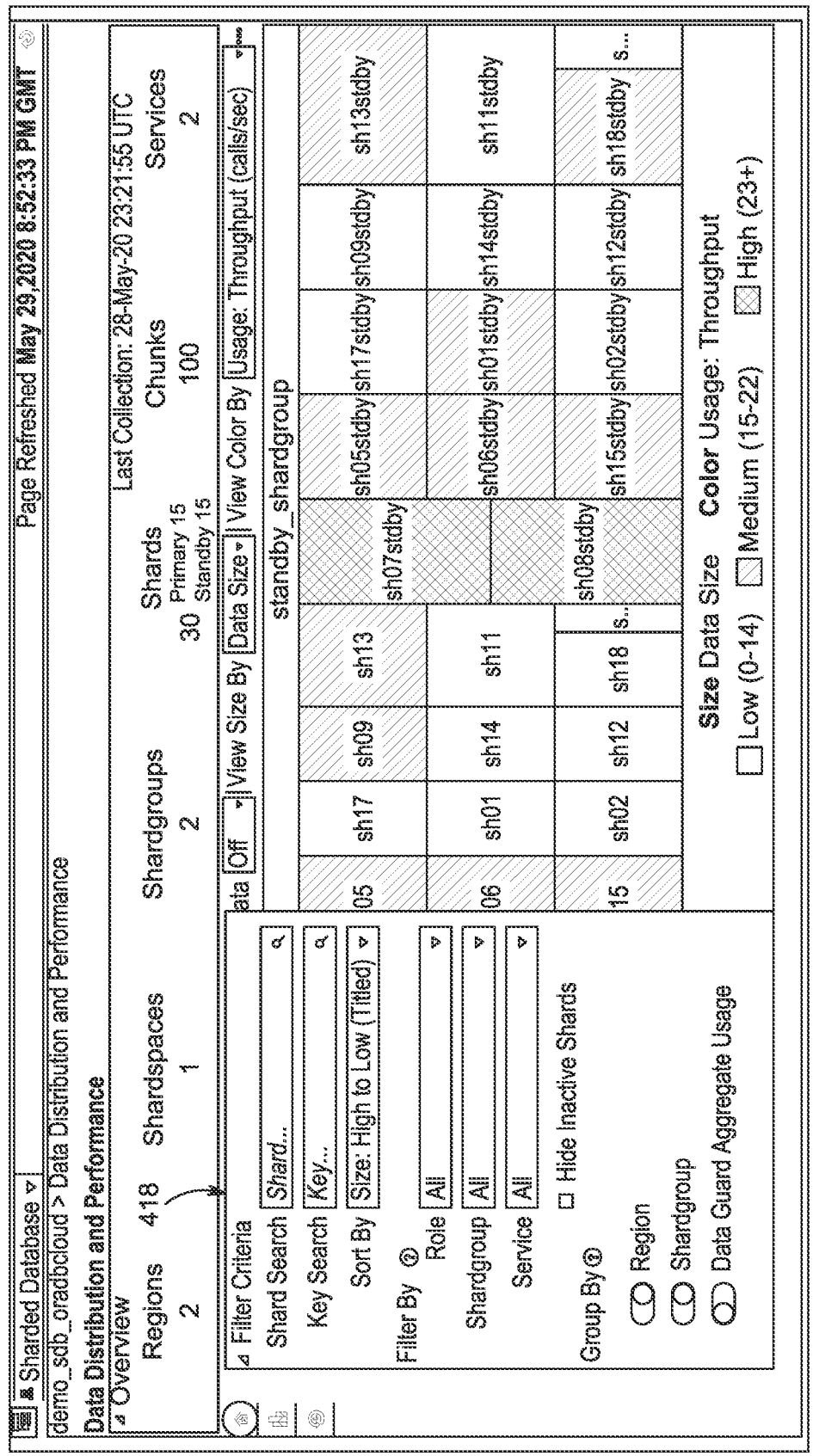

In an embodiment, the information shown in the GUI 400 is user-configurable by applying one or more user-specified filters. FIG. 4J shows an example of user-definable filter criteria 418 in accordance with one or more embodiments. In this example, one or more of the filter criteria 418 include(s) controls to: search for one or more specific shards; search for one or more specific keys; specify a sort order (e.g., tiled by size from highest to lowest); filter by role; filter by shardgroup; filter by service; choose whether to hide inactive shards; and/or specify grouping criteria (e.g., by region, shardgroup, and/or Data Guard aggregate usage). Data Guard is a product of Oracle Corporation.

4.2. Segmented Datasets

One or more embodiments may be practiced using datasets that are segmented according to one or more segmentation criteria, even if the datasets are not distributed and/or replicated. A data storage system may be configured to store a dataset in multiple portions, segmented across multiple storage devices and/or different regions of one storage device, based on the segmentation criteria. Each portion may be further segmented into respective sub-portions.

In one example, a dataset is stored on two portions of one or more storage devices. A first portion is stored with an affinity for East Cost data (i.e., data originating from, transmitted to, and/or otherwise associated with the East Coast region of the United States). A second portion is stored with an affinity for West Coast data (i.e., data originating from, transmitted to, and/or otherwise associated with the West Coast region of the United States).

Continuing the example, the system determines demand values separately for both the first portion and the second portion. The demand value for each portion may be an aggregate of demand values for that portion's sub-portions. The system may present the resulting demand values in a user interface, using techniques described herein. Alternatively or additionally, based on the demand values, the system may relocate one or more sub-portions from the first portion to the second portion, and/or vice versa. For example, the system may analyze the demand value associated with a sub-portion currently stored with an affinity for East Coast data and determine that the demand tends to originate from the West Coast region of the United States; based on this determination, the system may move that sub-portion to the portion stored with an affinity for West Coast data. Alternatively or additionally, when the system moves a sub-portion from one portion to the other, the system may also adjust an algorithm that guides the affinity with which data is routed to either the first portion or the second portion. Techniques such as those described in this example can help ensure that sub-portions of segmented data are stored in the most effective (e.g., with respect to latency and/or other performance metrics) segment of a dataset, even if the data was originally stored in a less effective dataset.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
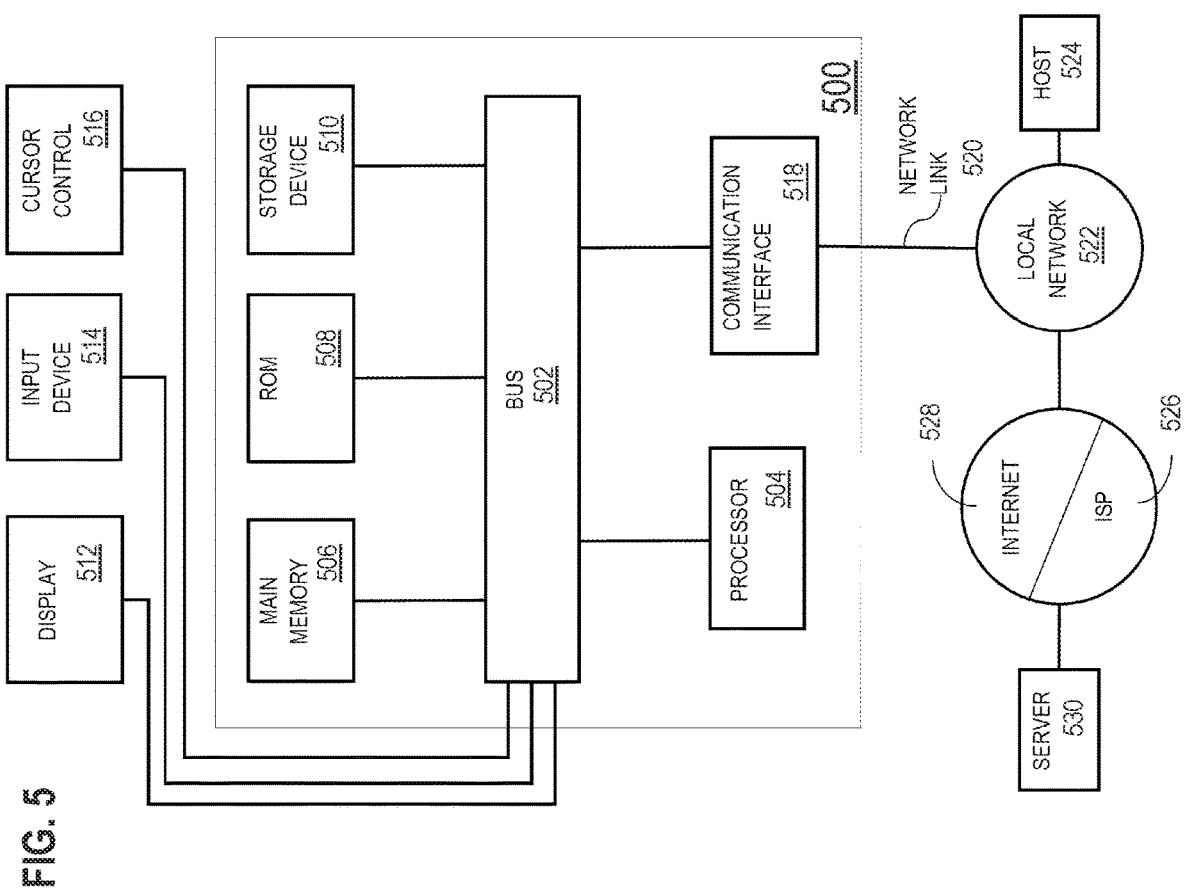
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In some examples, dataset resource instances are instantiations of combinations of the various components described above that are configured to execute operations on datasets. For example, one or more storage servers may store various datasets associated with a database. Management software performing some or all of the operations described above may execute on a separate server that is in communication, via a network link, with the one or more storage servers so that network service demands may be monitored. An administrator may instruct the management software via a user interface operating on a mobile computer or user workstation that transmits the instructions via the Internet.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
   determining, for each respective dataset resource instance of a first plurality of dataset resource instances corresponding to a first dataset of a plurality of datasets, a first service demand metric that quantifies service demand on the respective dataset resource instance;
   identifying a first aggregate level of service demands on the first dataset based on the service demand metrics for the first plurality of dataset resource instances;
   determining, for each respective dataset resource instance of a second plurality of dataset resource instances corresponding to a second dataset of the plurality of datasets, a second service demand metric that quantifies service demand on the respective dataset resource instance;
   identifying a second aggregate level of service demands on the second dataset based on the service demand metrics for the second plurality of dataset resource instances; and
   concurrently presenting, in a user interface, the first aggregate level of service demands on the first dataset and the second aggregate level of service demands on the second dataset.

2. The medium of claim 1, further comprising concurrently displaying, with the first aggregate level and the second aggregate level, each of the service demands on the first plurality of dataset resource instances and each of the service demands on the second plurality of dataset resource instances.

3. The medium of claim 1, wherein:
   the first dataset comprises a first set of rows, of a particular table, replicated across the first plurality of dataset resource instances; and
   the second dataset comprises a second set of rows, of the particular table, replicated across the second plurality of dataset resource instances.

4. The medium of claim 3, wherein:
   the first set of rows comprises a plurality of data chunks, wherein each data chunk comprises a corresponding subset of the first set of rows;
   determining that the first aggregate level of service demands on the first dataset is above a first threshold and the second aggregate level of service demands on the second dataset is below the first threshold;
   determining that at least one data chunk of the plurality of data chunks of the first dataset is associated with a chunk service demand above a chunk service threshold; and
   relocating the at least one data chunk from the first plurality of dataset resource instances to the second plurality of dataset resource instances.

5. The medium of claim 4, further comprising, before the relocating operation:
   determining that relocating the at least one data chunk will reduce the first aggregate level of service demands on the first dataset to below the first threshold.

6. The medium of claim 3, wherein:
   the first set of rows comprises a plurality of data chunks, wherein each data chunk of the plurality comprises a corresponding subset of the first set of rows;
   determining that the first aggregate level of service demands on the first dataset is above a first threshold and the second aggregate level of service demands on the second dataset is below the first threshold;
   determining that at least one data chunk of the plurality of data chunks on the first dataset is associated with a chunk service demand above a chunk service threshold; and
   generating a recommendation to move the at least one data chunk from the first plurality of dataset resource instances to the second plurality of dataset resource instances.

7. The medium of claim 6, wherein determining that the at least one data chunk of the plurality of data chunks of the first dataset is associated with the chunk service demand above the chunk service threshold further comprises identifying a particular data chunk of the at least one data chunk having a highest chunk service demand of the plurality of data chunks of the first dataset.

8. The medium of claim 1, further comprising partitioning a dataset into a plurality of data portions, wherein each data portion comprises a horizontal partition of the dataset replicated across a plurality of dataset resource instances.

9. One or more non-transitory computer-readable media storing instructions, which when executed by one or more hardware processors, cause performance of operations comprising:
   determining, for each respective dataset resource instance of a first plurality of dataset resource instances corresponding to a first dataset of a plurality of datasets, a first service demand metric that quantifies service demand on the respective dataset resource instance;
   identifying a first aggregate level of service demands on the first dataset based on the service demand metrics for the first plurality of dataset resource instances;
   determining, for each respective dataset resource instance of a second plurality of dataset resource instances corresponding to a second dataset of the plurality of datasets, a second service demand metric that quantifies service demand on the respective dataset resource instance;
   identifying a second aggregate level of service demands on the second dataset based on the service demand metrics for the second plurality of dataset resource instances; and
   based at least on the first aggregate level of service demands on the first dataset and the second aggregate level of service demands on the second dataset:
      relocating a data chunk from the first plurality of dataset resource instances to the second plurality of dataset resource instances.

10. The medium of claim 9, wherein the first dataset corresponds to a first set of rows of a particular table and the second dataset corresponds to a second set of rows of the particular table and relocating the data chunk comprises relocating a subset of the first set of rows from the first plurality of dataset resource instances to the second plurality of dataset resource instances.

11. The medium of claim 9, further comprising partitioning a dataset into a plurality of data portions, wherein each data portion comprises a horizontal partition of the dataset replicated across a plurality of dataset resource instances.

12. A method comprising:
   determining, for each respective dataset resource instance of a first plurality of dataset resource instances corresponding to a first dataset of a plurality of datasets, a first service demand metric that quantifies service demand on the respective dataset resource instance;

identifying a first aggregate level of service demands on the first dataset based on the service demand metrics for the first plurality of dataset resource instances;

determining, for each respective dataset resource instance of a second plurality of dataset resource instances corresponding to a second dataset of the plurality of datasets, a second service demand metric that quantifies service demand on the respective dataset resource instance;

identifying a second aggregate level of service demands on the second dataset based on the service demand metrics for the second plurality of dataset resource instances; and concurrently presenting, in a user interface, the first aggregate level of service demands on the first dataset and the second aggregate level of service demands on the second dataset.

13. The method of claim 12, further comprising concurrently displaying, with the first aggregate level and the second aggregate level, each of the service demands on the first plurality of dataset resource instances and each of the service demands on the second plurality of dataset resource instances.

14. The method of claim 12, wherein:
the first dataset comprises a first set of rows, of a particular table, replicated across the first plurality of dataset resource instances; and
the second dataset comprises a second set of rows, of the particular table, replicated across the second plurality of dataset resource instances.

15. The method of claim 14, wherein:
the first set of rows comprises a plurality of data chunks, wherein each data chunk comprises a corresponding subset of the first set of rows, the method further comprising:
determining that the first aggregate level of service demands on the first dataset is above a first threshold and the second aggregate level of service demands on the second dataset is below the first threshold;
determining that at least one data chunk of the plurality of data chunks of the first dataset is associated with a chunk service demand above a chunk service threshold; and
relocating the at least one data chunk from the first plurality of dataset resource instances to the second plurality of dataset resource instances.

16. The method of claim 15, further comprising:
before the relocating operation: determining that relocating the at least one data chunk will reduce the first aggregate level of service demands on the first dataset to below the first threshold.

17. The method of claim 14, wherein:
the first set of rows comprises a plurality of data chunks, wherein each data chunk of the plurality comprises a corresponding subset of the first set of rows, the method further comprising:
determining that the first aggregate level of service demands on the first dataset is above a first threshold and the second aggregate level of service demands on the second dataset is below the first threshold;
determining that at least one data chunk of the plurality of data chunks on the first dataset is associated with a chunk service demand above a chunk service threshold; and
generating a recommendation to move the at least one data chunk from the first plurality of dataset resource instances to the second plurality of dataset resource instances.

18. The method of claim 17, wherein determining that the at least one data chunk of the plurality of data chunks of the first dataset is associated with the chunk service demand above the chunk service threshold further comprises identifying a particular data chunk of the at least one data chunk having a highest chunk service demand of the plurality of data chunks of the first dataset.

19. The method of claim 17, wherein the generating operation further comprises:
generating a row service demand score for each row of each chunk of the first dataset and using the row service demand scores to generate a chunk service demand score;
ranking the chunks based on the corresponding chunk service demand score; and
using the ranking to generate the recommendation to move the at least one data chunk from the first plurality of dataset resource instances to the second plurality of dataset resource instances.

20. The method of claim 12, further comprising partitioning a dataset into a plurality of data portions, wherein each data portion comprises a horizontal partition of the dataset replicated across a plurality of dataset resource instances.

21. A method comprising:
determining, for each respective dataset resource instance of a first plurality of dataset resource instances corresponding to a first dataset of a plurality of datasets, a first service demand metric that quantifies service demand on the respective dataset resource instance;
identifying a first aggregate level of service demands on the first dataset based on the service demand metrics for the first plurality of dataset resource instances;
determining, for each respective dataset resource instance of a second plurality of dataset resource instances corresponding to a second dataset of the plurality of datasets, a second service demand metric that quantifies service demand on the respective dataset resource instance;
identifying a second aggregate level of service demands on the second dataset based on the service demand metrics for the second plurality of dataset resource instances; and
based at least on the first aggregate level of service demands on the first dataset and the second aggregate level of service demands on the second dataset:
relocating a data chunk from the first plurality of dataset resource instances to the second plurality of dataset resource instances.

* * * * *

UNITED STATES PATENT AND TRADEMARK OFFICE
CERTIFICATE OF CORRECTION

| | | |
|---|---|---|
| PATENT NO. | : 12,086,160 B2 | Page 1 of 1 |
| APPLICATION NO. | : 17/699817 | |
| DATED | : September 10, 2024 | |
| INVENTOR(S) | : Kumar et al. | |

It is certified that error appears in the above-identified patent and that said Letters Patent is hereby corrected as shown below:

On the Title Page

On page 2, Column 2, Item (56) under other publications, Line 6, delete "Retreived" and insert -- Retrieved --, therefor.

In the Claims

In Column 1, Line 29, in Claim 2, delete "medium" and insert -- media --, therefor.

In Column 1, Line 35, in Claim 3, delete "medium" and insert -- media --, therefor.

In Column 1, Line 42, in Claim 4, delete "medium" and insert -- media --, therefor.

In Column 1, Line 57, in Claim 5, delete "medium" and insert -- media --, therefor.

In Column 1, Line 62, in Claim 6, delete "medium" and insert -- media --, therefor.

In Column 2, Line 11, in Claim 7, delete "medium" and insert -- media --, therefor.

In Column 2, Line 18, in Claim 8, delete "medium" and insert -- media --, therefor.

In Column 2, Line 51, in Claim 10, delete "medium" and insert -- media --, therefor.

In Column 2, Line 58, in Claim 11, delete "medium" and insert -- media --, therefor.

Signed and Sealed this
Seventh Day of January, 2025

Derrick Brent
*Acting Director of the United States Patent and Trademark Office*